United States Patent [19]

Standley

[11] 4,443,280
[45] Apr. 17, 1984

[54] METHOD OF MAKING AN ENDLESS POWER TRANSMISSION BELT

[75] Inventor: Paul M. Standley, Springfield, Mo.

[73] Assignee: Dayco Corporation, Dayton, Ohio

[21] Appl. No.: 307,056

[22] Filed: Sep. 30, 1981

Related U.S. Application Data

[62] Division of Ser. No. 104,616, Dec. 17, 1979, Pat. No. 4,299,588.

[51] Int. Cl.³ .............................................. B29H 7/22
[52] U.S. Cl. .................................... 156/137; 428/113; 428/920
[58] Field of Search ................ 156/137, 142; 474/264, 474/265, 268, 263; 428/113, 920, 402, 408, 206, 323, 244; 152/374, 309, 360

[56] References Cited

U.S. PATENT DOCUMENTS

| 3,462,340 | 8/1969 | Hough | 428/113 |
| 4,024,773 | 5/1977 | Hartman | 474/265 |
| 4,031,768 | 6/1977 | Henderson | 474/250 |

FOREIGN PATENT DOCUMENTS 1755301 3/1959 Fed. Rep. of Germany ... 152/209 R

*Primary Examiner*—Michael W. Ball
*Attorney, Agent, or Firm*—Joseph V. Tassone

[57] ABSTRACT

A raw-edge, endless power transmission belt is provided which comprises a plurality of layers. At least one of these layers is a fabric layer; another layer is composed primarily of elastomeric material; and at least one further layer is an elastomeric material having a heat-conducting amount of a pyrolytic graphite dispersed therethrough. The pyrolytic graphite-containing elastomeric layer is disposed between any two other layers in the belt and acts to conduct heat to the outside of the belt. Also provided is a method for making this belt.

4 Claims, 3 Drawing Figures

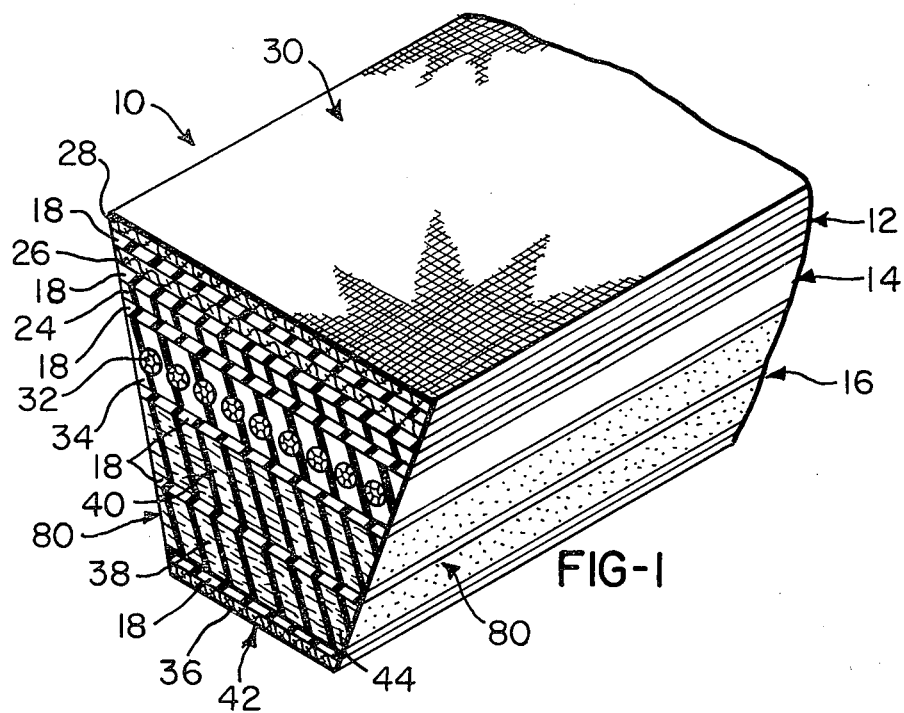
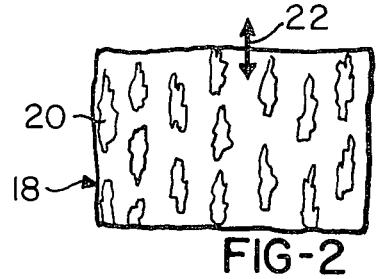

METHOD OF MAKING AN ENDLESS POWER TRANSMISSION BELT

CROSS-REFERENCE TO RELATED PATENT APPLICATION

This patent application is a divisional patent application of its copending parent application Ser. No. 104,616 filed Dec. 17, 1979, now U.S. Pat. No. 4,299,588.

BACKGROUND OF THE INVENTION

This invention relates to endless power transmission belts.

So-called raw-edged endless, trapezoidal power transmission belts are well known in the art. These belts are made primarily of elastomeric material and generally comprise a helically-wound load-carrying cord and may also comprise one or more layers of fabric. The elastomeric material may also have a plurality of fibers dispersed therethrough.

During operation of such belts around associated pulleys or sheaves, there is repeated flexing and imposition of stresses thereon, leading to a buildup of heat within the belt, which may ultimately cause premature belt failure. This problem becomes increasingly acute with belts employed upon motor vehicle engines, since the trend appears to be toward higher engine compartment temperatures. One approach to providing a cool running belt is disclosed in U.S. Pat. No. 1,860,269. That belt has a plurality of transverse apertures or perforations extending from one side surface of the belt to the other, and arranged in spaced relation the full length of the belt.

Heretofore, it is also known to incorporate graphite into at least one of the elastomeric layers of a belt in order to reduce the belt to sheave coefficient of friction. This feature is disclosed in U.S. Pat. Nos. 4,024,773 and 4,031,768.

It has now been discovered that the heat buildup in a raw-edge power transmission belt can be reduced by incorporating a particular type of graphite into at least one layer of the belt. This heat-reducing feature is not seen when ordinary graphite is used.

Accordingly, it is an object of the present invention to provide a novel, cool running, raw-edge, endless power transmission belt.

Another object of the present invention is to provide a method for making the above belt.

Other objects, aspects and advantages of the present invention will be apparent to those skilled in the art from the following specification, the appended claims and the attached drawing.

SUMMARY OF THE INVENTION

In accordance with the present invention there is provided a cool-running, raw-edge endless power transmission belt which comprises at least one layer of an elastomeric material comprising a heat-conducting amount of a pyrolytic graphite.

Also provided is a method for constructing a cool-running belt which comprises the steps of uniformly dispersing a pyrolytic graphite throughout an elastomeric material, calendering the graphite/elastomer composition to orient the graphite particles and incorporating the resulting calendered sheet into a belt so that the oriented graphite particles lie with their long axes perpendicular to the longitudinal axis of the belt.

BRIEF DESCRIPTION OF THE DRAWING

In the drawing,

FIG. 1 illustrates a raw-edge V-type endless power transmission belt of laminated construction;

FIG. 2 illustrates orientation of the pyrolytic graphite particles in a calendered sheet; and FIG. 3 is a perspective view illustrating a cogged V-belt in accordance with the invention.

DETAILED DESCRIPTION OF THE DRAWING

Referring now to the drawing, FIG. 1 illustrates a belt 10 which comprises a tension section 12, a load-carrying section 14 and a compression section 16. The belt 10 has at least one layer of elastomeric material having a pyrolytic graphite uniformly dispersed therethrough and this layer is designated generally by the reference numeral 18.

The layer 18 is a relatively thin layer of an elastomeric material containing a heat-conducting amount of pyrolytic graphite dispersed homogeneously therethrough. The layer 18 is made by uniformly dispersing a desired amount, generally from about 10 to about 100 parts by weight of a pyrolytic graphite throughout 100 parts by weight of a desired elastomeric material. The elastomer/pyrolytic graphite mixture is then calendered to produce the thin layer 18 and to orient a substantial portion of the pyrolytic graphite particles. Referring briefly to FIG. 2, a few representative particles 20 are shown with their long axes oriented in the direction indicated by the double headed arrow 22. Such orientation is produced when the elastomer/pyrolytic graphite mixture is calendered to produce the thin layer 18. The layer 18 may range in thickness from about 0.015- to about 0.100-inch (about 0.4 to about 2.5 mm), preferably about 0.020- to about 0.050-inch (about 0.5 to about 1.25 mm).

Referring again to FIG. 1, the tension section 12 comprises a plurality of layers and in this example includes a layer of elastomeric material 24 and fabric layers 26 and 28, with the fabric layer 28 being disposed remote from the load-carrying section 14 and having a surface which defines the outside surface 30 of the belt 10. The tension section also includes thin layers 18 of the elastomer/pyrolytic graphite mixture disposed between the fabric layers 26 and 28 and between the layer of elastomeric material 24 and the fabric layer 26.

The load-carrying section 14 has load-carrying means in the form of a helically-wound load-carrying cord 32 which is suitably embedded in an elastomeric cushion 34 in accordance with techniques which are well known in the art. The cord 30 may be made of any suitable material known in the art, natural or synthetic such as rayon, polyester, nylon, aramid or the like.

The compression section 16 comprises a plurality of layers and in this example includes a layer of fabric 36 and fiber-loaded layers 38 and 40 with the fabric layer 36 being remote from the load-carrying section and having a surface which defines the inside surface 42 of the belt 10. The compression section also includes a layer 18 of the elastomer/pyrolytic graphite mixture disposed between the fiber-loaded layers 38 and 40 and another layer 18 between the fiber-loaded layer 38 and the fabric layer 36.

The belt 10 also comprises layers 18 of the elastomer/pyrolytic graphite mixture disposed between the elastomeric layer 24 and the cushion layer 34, and between the cushion layer 34 and the fiber-loaded layer 40.

Each of the fiber-loaded layers 38 and 40 has a plurality of fibers 44 homogeneously dispersed therethrough and each layer 38 and 40 is made of a suitable elastomeric compound. The fibers 44 may be made of any suitable material, natural or synthetic, such as cotton, rayon, polyester, nylon, aramid or the like. These fibers generally have a diameter in the approximate range of 0.001 to 0.050 inch and a length in the approximate range of 0.001 to several inches.

Each of the fabric layers 26, 28 and 36 may be made of any suitable material, natural or synthetic, such as cotton, rayon, polyester, nylon, aramid and the like, including blends thereof. The fabric may be woven, non-woven, or knitted. Woven fabric may be bias-cut or stress-relieved.

The belt 10 is made in accordance with procedures well known in the art, i.e., the various layers are sequentially wound around a suitable rotatable mandrel assembly to form a belt sleeve. The resulting belt sleeve is then vulcanized, or otherwise cured, and a plurality of belts 10 are thereafter cut from the vulcanized sleeve.

The belt 10 is exemplary only, and is intended to illustrate the disposition of layers 18 of the elastomer/pyrolytic graphite mixture between any two other layers in the belt, such as between two fabric layers 26 and 28, between a fabric layer 26 and a layer 24 of elastomeric material, and between two layers of elastomeric material 38 and 40, or 24 and 34. During the building step, the layer or layers 18 are turned so that the long axes of the pyrolytic graphite particles 20 are oriented in the direction of the rotational axis of the building mandrel, and therefore, in the finished belt 10 the particle long axes will be approximately perpendicular to the longitudinal axis of the belt 10.

Another exemplary embodiment of the present invention is shown in FIG. 3 and this belt is designated generally by the reference numeral 50. The belt 50 differs from the belt 10 in that it has fewer component layers and is of the so-called "cog" type, as will be hereinafter described.

The belt 50 has a tension section 52, a load-carrying section 54 and a "toothed" or "cogged" compression section 56.

The tension section 52 comprises a layer of elastomeric material 58 and a fabric layer 60, with the fabric layer being disposed remote from the load-carrying section 54 and having a surface which defines the outside surface 62 of the belt 50.

The compression section 56 comprises a layer of elastomeric material 64 and a fabric layer 66, with the fabric layer 66 being disposed remote from the load-carrying section 54 and having a surface which defines the inside surface 68 of the belt 50. The outer portion of the compression section has a toothed or cogged configuration defined by a plurality of alternating projections 70 and recesses 72, and the fabric layer 66 extends in a smooth undulating path.

The load-carrying section 54 has load-carrying means in the form of a helically-wound load-carrying cord 74 which is suitably embedded in an elastomeric cushion 76.

A layer 78 of an elastomer/pyrolytic graphite mixture is disposed between the elastomeric layers 58 and 76 of the tension and load-carrying sections, respectively, and between the elastomeric layers 76 and 64 of the load-carrying and compression sections, respectively. The layer 78 is the same as the layer 18.

The belt 50 may be made using any suitable technique known in the art.

The belts 10 and 50 are known in the art as "raw-edge" belts, so-called because the belts are constructed, as described briefly above, vulcanized and then cut into the truncated V shape illustrated. The non-parallel sides 80 of the belt 10 and the sides 82 of the belt 50 are not covered and the various component layers are left exposed or "raw". During operation of these belts around associated pulleys or sheaves, heat generated within the belt due to internal stresses, repeated flexing, and the like, is conducted by means of the elastomer/pyrolytic graphite layers 18 and 78 to the exposed sides 80 and 82, respectively, where such heat may be dissipated to the surrounding atmosphere and/or the pulleys.

The belts 10 and 50 are made primarily of elastomeric material and are illustrated as being made of rubber. The elastomeric material may be any material, natural or synthetic, having desirable elastomeric properties. Examples of such material include natural rubber, polychloroprene, polybutadiene, styrene-butadiene rubber, acrylonitrile butadiene copolymer, polyisoprene, and the like, and blends thereof.

The pyrolytic graphite is a synthetic graphite and, preferably, has a carbon content of at least 95% and a thermal conductivity of at least 75 watts per M°K. (520 Btu-in./h-ft$^2$-°F.).

The following example illustrates the invention.

EXAMPLE

A series of vulcanizates were prepared containing the amounts of polymer, graphite, carbon black, clay and fiber shown in Table I, which follows:

TABLE I

| Compounding Recipes | | | | | |
|---|---|---|---|---|---|
| | A (control) | B | C | D | E |
| Neoprene GNA | 100 | 100 | 100 | 100 | 100 |
| N351 Carbon Black | 20 | 20 | 20 | 20 | 15 |
| Graphite | 70[4] | 70[4] | 70[5] | 70[6] | 70[6] |
| Clay[1] | — | — | — | — | 8.32 |
| Fibers[2] | — | 23 | — | — | — |
| Other Ingredients[3] | 21.65 | 21.65 | 21.65 | 21.65 | 21.65 |

[1] a natural clay of the alumina silica type
[2] a blend of cotton and polyester fibers
[3] includes vulcanizing ingredients, processing aids, accelerators, antioxidants and the like
[4] a Mexican grade, naturally occurring graphite having a maximum of 12% silica
[5] a pyrolytic graphite, 100-mesh from Union Poco Graphite, Inc., 1601 S. State Street, Decatur, Texas
[6] a pyrolytic graphite, 65-mesh from Union Poco Graphite, Inc.

The above quantities are expressed in parts by weight per 100 parts by weight of the neoprene (phr).

Each of the above compositions was vulcanized and test samples were prepared therefrom. The thermal conductivities of these samples were determined according to the method described by J. Atkins and J. Sullivan in Rubber Chemistry and Technoldgy, Vol. 42, pp 1314–20 (December 1969).

Table II, below, sets forth the thermal conductivities of the stocks given in Table I, in the longitudinal direction, i.e., in the direction of the longer axes of the graphite particles, and in the transverse direction.

TABLE II

| | Thermal Conductivity (Btu/hr-ft-°F.) | | |
|---|---|---|---|
| | Longitudinal | Transverse | Ratio L/T |
| A (control) | 0.2390 | 0.2299 | 1.0396 |

TABLE II-continued

| | Thermal Conductivity (Btu/hr-ft-°F.) | | |
|---|---|---|---|
| | Longitudinal | Transverse | Ratio L/T |
| B | .2106(−11.9%) | .2099(−8.7%) | 1.0033 |
| C | .2762(+15.6%) | .2450(+6.6%) | 1.1273 |
| D | .2705(+13.2%) | .2228(+3.1%) | 1.2141 |
| E | .2568(+7.4%) | .2479(+7.8%) | 1.0359 |

The figures in parentheses indicate the percentage increase (or decrease) in thermal conductivity of each composition as compared to the control A.

Examination of the above data reveals the following.

a. Comparing compositions A and B, it is seen that the presence of fibers tends to decrease thermal conductivity in both directions.

b. Comparing compositions A and C, and A and D, it is seen that pyrolytic graphite increases thermal conductivity in at least the longitudinal direction thereof.

c. Comparing compositions C and D, it is seen that the smaller particle size of pyrolytic graphite is more effective in conducting heat.

d. Comparing compositions D and E, it is seen that the addition of clay decreases the thermal conductivity of composition E.

Reasonable variations and modifications, which will be apparent to those skilled in the art, can be made in this invention without departing from the spirit and scope thereof.

I claim:

1. In a method for constructing a raw edge, endless power transmission belt which comprises the steps of sequentially winding a plurality of layers around a rotatable mandrel assembly to form a belt sleeve, wherein at least one of said layers is a fabric layer and at least one other of said layers is composed primarily of elastomeric material, vulcanizing the resulting belt sleeve and cutting a plurality of belts from the vulcanized sleeve, the improvement comprising the steps of forming a further layer of elastomeric material having pyrolytic graphite particles dispersed substantially uniformly therethrough and being oriented therein so that the long axes of said graphite particles substantially extend in the same direction, and winding at least one said further layer around said mandrel assembly so as to be disposed between two layers in said sleeve and so that the long axes of the pyrolytic graphite particles are oriented in the direction of the rotational axis of said building mandrel whereby said particles will be adapted to conduct heat to the raw side edges of the belts subsequently cut from said belt sleeve.

2. The method of claim 1 wherein said further layer is disposed between two of said fabric layers.

3. The method of claim 1 wherein said further layer is disposed between a fabric layer and an elastomeric layer.

4. The method of claim 1 wherein said further layer is disposed between two of said elastomeric layers.

* * * * *